March 1, 1966 T. W. MILLS 3,237,360

FASTENING MEANS FOR OVERLAPPING BOARDS

Filed Oct. 16, 1963 2 Sheets-Sheet 1

INVENTOR.
THOMAS W. MILLS
BY James T. McMiller
- ATTORNEY -

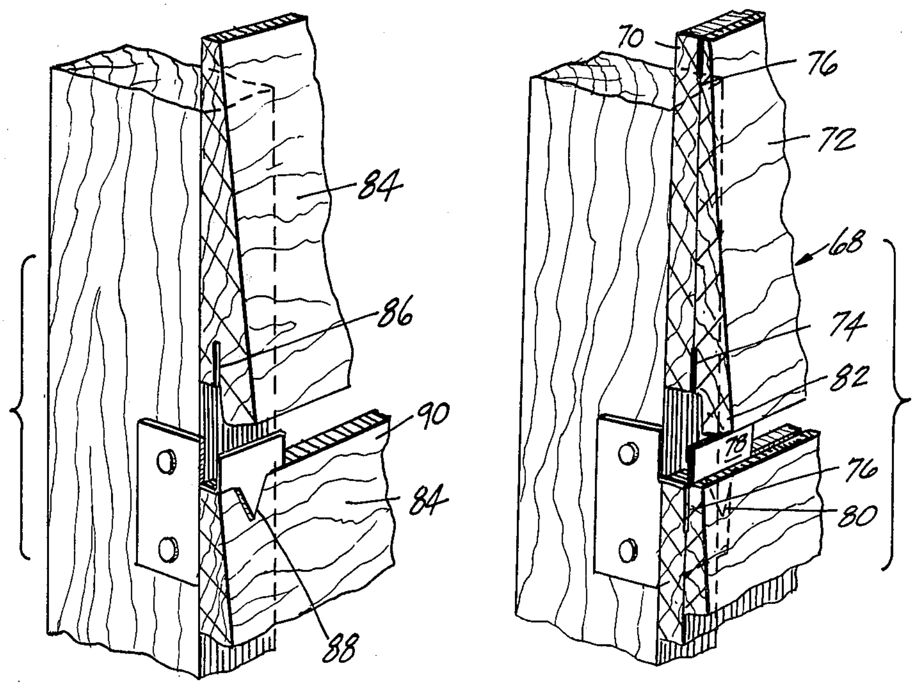
Fig. 5.
Fig. 6.
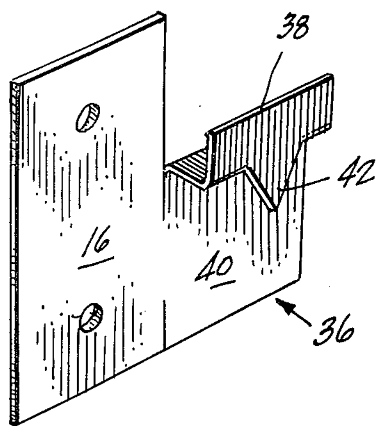
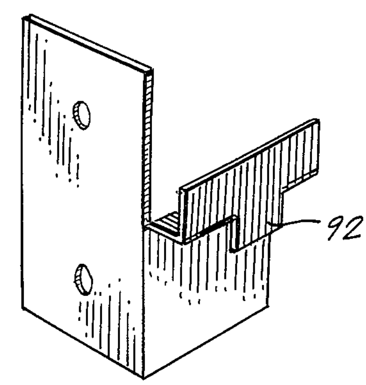
Fig. 7.
Fig. 8
INVENTOR.
THOMAS W. MILLS
BY James T. McQuillan
ATTORNEY 3,237,360
FASTENING MEANS FOR OVERLAPPING BOARDS
Thomas W. Mills, 31 Sweet Bay Road, Portuguese Bend, Calif.
Filed Oct. 16, 1963, Ser. No. 316,764
3 Claims. (Cl. 52—483)

This invention relates to fastening means and more particularly to a device for securing boards or planks, which are mounted horizontally in overlapping side to side and abutting end to end relationship, to appropriate supporting structure.

The invention is particularly useful in connection with siding or other material where it is deemed desirable to mount or attach the individual pieces to supporting structure without the necessity of driving nails or other fasteners through the pieces being so secured to supporting members; for as will be hereinafter pointed out, the device of the present invention achieves its objectives and at the same time eliminates the need of driving nails or other fastening devices through wood or other material which is to be used either inside or outside a building as an external finish in applications such as facing or siding. In addition the fastener of the present invention accomplishes its objectives while at the same time remaining invisible to anyone viewing the completed joint from the finished side of the wall or other surface being constructed. The invention is useful in connection with most materials being used as facing, paneling, siding, and the like and has efficacious application to wood and wood products such as plywood, synthetic wood (such as masonite), insulation board and veneer.

In the building trades and particularly that portion thereof relating to home construction, there are many occasions where a finished wall or other surfaces is formed or constructed by suitably attaching planking, sheathing or other wood construction to supporting structure. For example, in the case of external walls, there are many applications where siding is nailed to the studding to provide an outside wall that is both strong and pleasing in appearance.

It should be understood that when a siding wall is built there are two separate and distinct fastening operations which must occur. It is essential that the boards be adequately joined to one another at their abutting end faces and also that the boards be suitably attached to the supporting structure.

As will be hereinafter indicated in detail, the fastener of the present invention can be effectively used with tapered siding boards to provide a tight and weatherproof exterior wall. In the case of so-called bevel siding such pieces are triangular in cross section and can be formed by cutting diagonally through a piece of potential siding material which is rectangular in cross section. There is thus provided two pieces of tapered or triangular siding which when applied horizontally can be slightly vertically overlapped when affixed to the studding to provide a construction which is both weathertight and aesthetically pleasing in appearance. To appreciate the function of the present invention it is helpful to understand siding wall construction practice.

Siding is normally used in exterior construction over the studding to complement and contrast with other exterior finishes such as stucco. In the case of bevel siding, it has previously been customary to bring the abutting ends of the boards together over an individual stud in order that such ends may be properly supported by nailing to the stud. Such a practice has deficiencies in that lumber waste and end splitting were concomitant parts of such a procedure.

To avoid the necessity of positioning the abutting ends of such end pieces over a stud, it has been previously proposed to employ various doweling devices or clamps to secure the abutting ends of such pieces of wood together at points intermediate the individual studs, such as, for example, a strip having a series of pointed prongs projecting laterally therefrom at each side. It has also been proposed to utilize a plate-like member having teeth formed upon each of its two oppositely disposed edges and a top stop tongue struck up out of the body. In addition, applicant's copending application Serial No. 186,596 discloses a satisfactory means to so connect the abutting ends.

Although such innovations have certain advantages, they have not completely solved all problems; for although it is possible to eliminate the nailing at the ends of the siding boards, it has still been necessary to continue to drive nails through each siding piece at the place where it abuts a stud. The need for this is obvious; for although some of the innovations described are adequate to fasten the abutting ends together, they do not serve to fasten the siding to the supporting studs. The obvious disadvantage in the procedure is the necessity of driving nails through what is intended to be a finished exterior wall. In the case of interior walls, the unsightly appearance of nail holes detracts considerably from the appearance of the wall, while in the case of outside walls as will be pointed out the problems involve more than aesthetics.

A deficiency in any exterior wall is considered to occur when the construction technique or imperfections in the wood provide a point where water or other moisture can find its way into the interior portion of the construction. Such moisture can result in dry rot, and can decrease the life of a building by a considerable length of time. In addition, it is becoming increasingly desirable to apply the finish to certain siding materials at the plant before the material is delivered. In certain cases, the manufacturers will warrant the material for an extended period of years provided it is installed without the necessity of driving nails or other fasteners through the material; for if the finish is punctured by a nail or similar device, it no longer is impervious to weather and the elements. As will be hereinafter described the present invention is well adapted for use in connection with such pre-prepared wooden materials; for it completely eliminates the necessity of nailing through the siding or paneling material. It thus eliminates the deficiencies discussed in connection with present construction practice.

The fastener of the present invention may be easily formed from material such as light gauge steel or aluminum and can be used with horizontal siding of various widths, and any other construction utilizing end and side abutting pieces, although its principal use is in connection with horizontal lap siding, and unlike previous clamps, it completely eliminates the necessity of nailing through the material to fasten to the studs. As has been emphasized the last feature is an extremely important one; for to construct a wall which presents a uniform and pleasing appearance, it is essential that the boards not be marked by nail heads and holes. As has been pointed out this is particularly so in the case of new siding material where enamel or other finishes are applied at the plant and any puncture has a very deleterious effect.

The present invention thus produces a clamping arrangement which is completely hidden by the abutting sides of the material, this being so in the case of siding when the pieces are tapered as is the common practice to secure tight flush joints adjacent the outermost surface of the siding. It further produces a light weight, inexpensive and, in the case of aluminum, rust proof fastening means. The boards to be fastened need not be nailed through, thus producing an aesthetically pleasing and weather resistant construction.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosures, which do not constitute departures from the spirit and scope of the invention.

The invention is illustrated in the accompanying drawings, wherein:

FIGURE 1 is a fragmentary, perspective, expanded view of a pair of siding members and one embodiment of the present fastener, the upper siding member being in a position to be hammer-tapped or otherwise forced into one receiving portion or socket of the fastener, and the lower siding member being brought into position to have the prong of the other portion of the fastener driven into the prong-receiving portion of said lower siding member so that the two pieces of siding overlap clapboard-wise and are attached by means of the fastener to the stud;

FIGURE 5 is a view similar to FIG. 1 and shows the fastener of the present invention being utilized in connection with another configuration of siding material other than that shown in FIGS. 1, 2 and 4;

FIGURE 6 is a view similar to the views of FIGS. 1 and 5 and shows the fastener of the present invention being utilized in connection with yet another configuration of siding material;

FIGURE 7 is a perspective view of another embodiment of the fastener of the present invention; and FIGURE 8 is a perspective view of still another or "flattened" embodiment of the generic invention.

Figure 1:
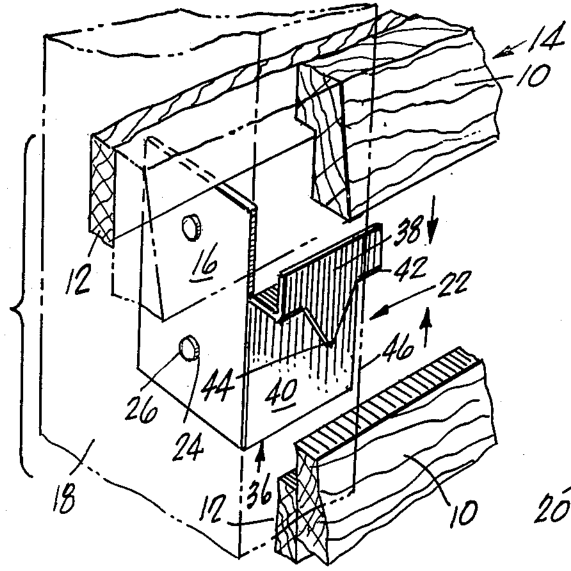
Figure 2:
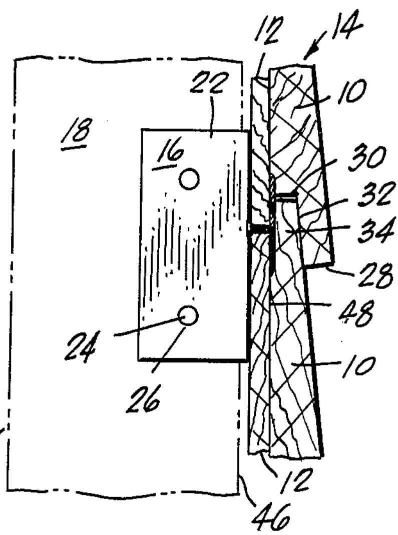
FIGURE 2 is a fragmentary assembly view taken along the line 2—2 of FIG. 4 and is partially in section and partially in vertical elevation, showing an exterior wall of a wooden frame building in which the fastener of the present invention is utilized to unite a pair of overlapping siding members to a stud.
Figure 4:
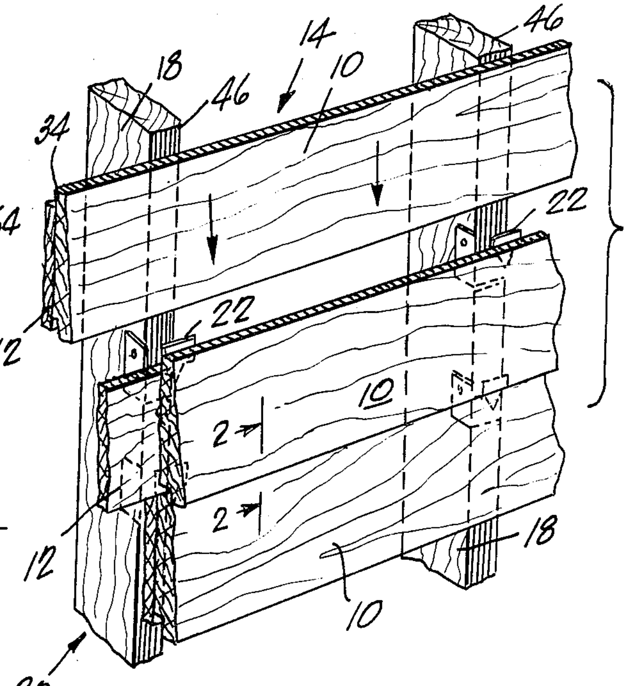
FIGURE 4 is a fragmentary, perspective, partially expanded view of a portion of a siding wall showing the fastening device of the present invention in place and suitably attached to the supporting studs.

Referring now to the drawings and particularly to FIGURES 1, 2 and 4 thereof, there is shown one embodiment of the present invention being used in connection with a tapered siding wall in which the individual exterior pieces or trim units 10 are attached as by gluing or other appropriate means to individual sheathing pieces or units 12, thus forming single composite siding members or panels 14 which are applied across the studding. It should be noted that the manufacture of such composite units 14 is usually accomplished at the factory using suitable adhesives and curing devices such as electronic ovens and the like to affix the sheathing 12 to the exterior tapered siding member 10.

Referring again to the drawings and FIGURES 1, 2 and 4 thereof, it can be readily seen in FIGURE 1 that the embodiment of the bracket or fastener 22 there depicted comprises a planar portion or web 16, adapted to fit congruently against one upright major or side face 18 of a stud 20, said stud in usual building practice being a two-by-four piece of lumber. The fastener 22 is securely affixed or attached to the stud 20 by means of nails 24 driven through nail holes 26. It should be understood that any suitable fasteners may be used to secure the fastener to the studding and that it is not essential that nails only be used although they have been found to be most convenient and practicable. The embodiment of the fastener 22 depicted in FIGURES 1, 2 and 4 is one so constructed as to fit the left-hand side of the stud 20, this direction determined standing facing the wall from the finished side.

From an inspection of FIGURES 1, 2 and 4 and particularly FIGURE 2, it will be noted that each siding member 14 of the present construction is wedge-shaped or upwardly tapered in cross section and that its thickest edge portion 28 bears a longitudinally extending groove 30 along its lower or thicker edge 28, said groove being formed and defined by offsetting the sheathing piece 12 a slight vertical distance from the siding piece 10 and providing a ship-lap cut-out portion 32 extending the length of the siding piece 10. It should further be noted that the top or thinner edge 34 of the siding piece has also been provided with an offset, the edge of the sheathing piece 12 terminating a short distance before the edge of the siding piece 10.

Adapted for cooperation with the siding piece 14 and with plate 16 is a separate part of the fastener 22, a longitudinally joggled portion 36 which lies substantially at a right angle to the planar portion 16. The upper arm or projection 38 of the joggle is offset outwardly from the lower portion 40 of the joggle. Protruding from the center of the outer edge 42 of the joggle is a projection spur, tongue, tooth or the like 44 sharply pointed and rigid enough to penetrate all but the hardest of woods. The web portion 40 of the joggled plate is adapted to fit congruently against the front, narrower face 46 of the two-by-four stud 20 as shown.

To affix a siding member rigidly to a stud by means of the fastener of the present invention, with the fastener after installation being invisible and without the necessity of driving nails or other fastening means through the siding, again referring to FIGURES 1, 2 and 4 the procedure is as follows. The fastener is placed adjacent the top edge of the siding unit and is lightly tapped downward forcing the spur or tooth 44 into the upper edge of the lower siding unit. As shown in FIGURE 2 in the configuration of siding there depicted the spur protrudes into the line of adhesion 48 between the exterior piece 10 and interior sheathing piece 12. The same procedure is accomplished at each point where the siding unit abuts a stud, each point of abutment utilizing a separate fastener.

The siding unit is then placed in position across the studs and the planar or plate portion 16 of the fastener is placed in congruent contact with one side wider face 18 of the stud 20 and nails 24 or other suitable fastening devices are driven through apertures 26 into the stud. The next upper siding piece is then similarly provided with the fasteners at its upper edge and the piece placed in position above the lower installed piece and tapped, hammered, or otherwise forced down to slightly vertically overlap the lower piece, the upper arm 38 of the joggle fitting snugly against the base of the sheathing piece 12 in the longitudinally extending groove 30. The fasteners affixed to the upper piece of siding are then attached to the studding in the manner just described and the two pieces are installed. The next strip of siding, extending between two adjacent studs and to each of which studs it is to be attached, is disposed above the topmost siding piece already installed and the aforesaid installation procedure is repeated until the wall is completed.

It is well to note that, if the siding pieces do not fully traverse the space between two adjacent studs, the circular disc fasteners disclosed in my co-pending application Serial No. 186,596 may satisfactorily be employed to solve this problem.

It should also be noted that as installed the utilization of the fastener does not necessitate the driving of any nails or other fasteners through the siding being applied. It is also important to note that when installed, the fastener is not visible to anyone viewing the wall from the finished or outside portion.

Figure 3:
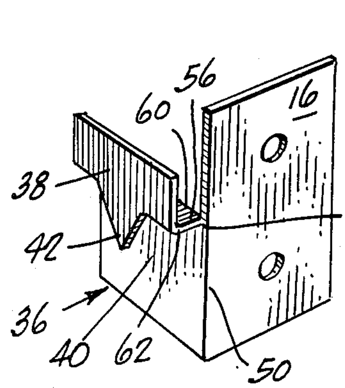
FIGURE 3 is a perspective view of an embodiment of the invention which is the mirror image of the fastener depicted in FIG. 1.

Referring again to the drawings and particularly to FIGURE 3 thereof, there is shown an embodiment of the fastener in which the operative portions are so reversed as to constitute a mirror image, so to speak, of the embodiment of the fastener depicted in FIGURES 1, 2 and 4 of the drawings. The main objective in providing such a configuration is to enable the fastener to be readily employable by being capable of being attached to either the left-hand or right-hand side face of the stud. Thus, as shown in FIGURES 1, 2 and 4 of the drawings, the embodiment of the fastener there depicted is attached to the left-hand side face of the stud while the embodiment depicted in FIGURE 3 is adapted to be attached to the right-hand side face of the stud, the direction as before being determined from a position facing the wall from the finished side. The method of construction of the wall and the end results are similar to those just described in conjunction with the fastener depicted in FIGURES 1, 2 and 4.

As before the fastener of FIGURE 3 is provided with a planar portion 16 and a longitudinally joggled portion 36 which lies substantially at a right angle to the planar portion 16. The upper arm 38 of the joggle is offset outwardly from the lower portion 40 of the joggle. As before, a spur or tooth 42 sharply pointed and rigid protrudes from the center of the outer edge of the joggle. In the embodiment depicted in FIGURE 3, the planar portion 16 is adapted to be attached to the right-hand face of the stud and the portion 40 of the joggled plate is adapted to fit congruently against the front face of the stud.

As has been pointed out, the fastener of the present invention can be easily formed from material such as light gauge steel or aluminum. Although in general any of the embodiments of the fastener of the present invention can be made in somewhat the same general manner, for purpose of illustration the method of manufacture will be described in connection with the embodiment depicted in FIGURE 3.

A piece of metal such as aluminum or light gauge steel approximately two inches by three inches is obtained. The piece of metal is then folded along its center longitudinal axis 50 until the two portions 40 and 16 are substantially at right angles to each other. The piece of metal is then cut along the center longitudinal axis to a point 56 midway the height of the fastener. The upper portion 38 of the fastener is then bent again through a ninety degree angle along its center horizontal axis 60. The upper portion 38 is then bent again, this time in an upward direction as depicted in FIGURE 3, the bend line 62 being located approximately one quarter inch offset from the previous center horizontal bend line 60, although this offset can, of course, vary depending upon the dimensions of the siding to be installed. Two side cuts are then made in the offset arm or shelf member 64 and the spur 42 bent down into position. It should be noted that the angled side cuts to produce the spur or tooth 42 may be made at the time just indicated or just before the first bend is made along the center longitudinal axis 50.

It should be understood that the fastener of the present invention can be utilized with various configurations of siding material, the construction being readily adapted to many installations. For example, there is depicted in FIGURE 6 the fasteners of FIGURES 1, 2 and 4 installed in a slightly modified siding joint. Here again, there is depicted a weather proofing siding unit 68 composed of both sheathing 70 and siding 72 properly fastened together, preferably in the manner previously discussed. However, the longitudinally extending groove 30 of FIGURES 1, 2, and 4 has been replaced with a longitudinally extending saw kerf 74.

Although the siding unit 68 again tapers upwardly, the offset between sheathing and siding pieces has been eliminated. The upper portion of the siding unit has similarly been provided with a saw kerf 76 extending the length of the piece. The upper portion 78 of the joggled face of the fastener is adapted for force fit within the kerf 74 and similarly the spur 80 of the fastener is adapted to be disposed in the saw kerf 76.

The method of installation and the construction techniques and results are the same as those described in connection with FIGURES 1, 2, and 4, there having been eliminated, however, the need to drive the spur 80 into a line of adhesion such as that shown at 48 in FIGURE 1. Rather, the spur has been provided with a previously prepared receiving slot, this configuration of siding being preferable in some instances. Again, the fastener does not require nails to be driven through the siding material and the fastener is invisible when installed, being hidden by the overlapping lip 82 of the next highest adjacent siding unit.

In FIGURE 5, there is depicted the fasteners of FIGURES 1 and 6 being utilized in an additional siding configuration. It should be noted that unlike FIGURES 1, 2, 4 and 6, the exterior siding piece has not been backed or attached to a sheathing piece. However, the siding piece 84 is again provided on its lower edge with a fastener receiving slot 86. The spur 88 of the fastener instead of being driven into a line of adhesion as in FIGURE 1 or being forced fit received in a pre-prepared receiving slot now simply overlaps the upper tapered end 90 of the siding piece. It should be understood that the method of installation is substantially as set out before and the construction joint achieves the same beneficial results. The purpose of the illustration is merely to show the versatility of the fastener of the present invention. Again as installed no nails are driven through the siding material and it is not visible to anyone viewing the finished wall from the outside.

Referring again to the drawing and particularly to FIGURE 7 thereof, there is shown another embodiment of the fastener of the present invention. The conformation, parts and construction of this embodiment is substantially identical with the structure of the aforesaid embodiments. In addition, there is the fact that the embodiment of FIGURE 8 is eminently adapted for fastening the siding configuration of FIGURE 5 to the studding. To this and other ends, in lieu of a prong such as that in the previous embodiment, a lip, tongue or the like, member 92 is provided and shaped, located, and arranged to enable it to overlap the outer face portion of one of two juxtaposed thin siding members such as shown in FIGURE 5. It should be understood that this embodiment may be used in the configuration of siding previously discussed, although it is preferable to always use a saw kerf or other receiving slot rather than attempt to drive the flat lip into the material, although such a lip can penetrate an adhesion line as that provided between sheathing and siding. Naturally, the length of member 92 is commensurate with the amount of overlap of sidings, being calibrated to a length that will render it invisible when in place.

In FIGURE 8 there is presented another embodiment of the invention which is provided to meet the cases wherein the planar part of the fastener is to be nailed to the narrow face of a stud. The fastener of FIGURE 8 is provided with a planar portion 16 and a joggled face 36. The upper arm 38 of the joggle is offset outwardly from the lower portion 40 of the joggle. As before a spur or tooth 42 sharply pointed and rigid extends from the center of the outer edge of the joggle.

The fastener of FIGURE 8 is made in much the same way as the previous embodiment with the exception that the first right angle bend along the center longitudinal axis of the piece of material is eliminated.

It should be understood that the embodiments of the fastener depicted in FIGURES 1, 5 and 6 could be installed in reverse position, that is, with the spur pointed upwardly. Similarly, the fastener of FIGURE 7 could be installed with the lip 92 either protruding upwardly or downwardly. The same installation alternatives are obviously also available for the embodiment of FIGURE 8 as well as the other embodiment depicted. It should also be clear that additional variations of siding not depicted could advantageously be used with the fastener of the present invention.

Although the now preferred embodiments of the present invention have been illustrated and described, it is to be understood that the invention need not be limited thereto for it is susceptible to changes in form and detail within the scope of the appended claims.

I claim:

1. A wooden framed structure comprising: a plurality of upright studs of rectangular cross section having front faces lying in a common vertical plane and having side faces lying in spaced vertical planes parallel to each other and perpendicular to said common plane; a plurality of thin, elongate siding members extending horizontally in said common plane in facewise relation against the front faces of said studs and in edgewise relation to each other to form an exterior wall; and a plurality of brackets for securing said siding members to said studs; each bracket including a first planar web lying flat against a side face of a stud and provided with fastening means passing only through said web to secure it to said stud, and a second planar web, devoid of fastening means, of lesser height than said first web integral with and extending at right angles of said first web and lying flat against the front face of said stud and cooperating with said first web to prevent rotation of said bracket in any direction with respect to said stud; said second web having a horizontal edge intermediate the ends of said first web; a shelf member extending horizontally outward from said horizontal edge a distance less than the thickness of said siding members and lying between the confronting edges of adjacent pairs of said siding members to prevent vertical movement thereof; and the free edge of said shelf member having planar upwardly and downwardly directed projections parallel to said second web and extending into the confronting edges of the adjacent siding members to prevent movement thereof away from said stud.

2. A structure as claimed in claim 1; said siding members each comprising a sheathing unit and a trim unit bonded together; and said projections extending in the plane of jointure of said units.

3. A wooden framed structure comprising: a plurality of slender elongate supports of rectangular cross section arranged in spaced parellel relation and having front faces lying in a common plane and side faces lying in planes perpendicular to said common plane; a plurality of thin, elongate siding members extending at right angles to the axes of said supports in said common plane in facewise relation against the front faces of said supports and in edgewise relation to each other to form a wall; and a plurality of brackets for securing said siding members to said supports; each bracket including a first planar web lying flat against a side face of a support and provided with fastening means passing only through said web to secure it to said support, and a second planar web, devoid of fastening means, integral with and extending at right angles to said first web and lying flat against the front face of said support and cooperating with said first web to prevent rotation of said bracket in any direction with respect to said support; a shelf member extending outwardly from said second web in a plane normal to the axis of said support a distance less than the thickness of said siding members and lying between the confronting edges of adjacent pairs of said siding members to prevent movement thereof in the direction of the support axis; said shelf member bearing oppositely directed projections extending into the confronting edges of the adjacent siding members to prevent movement thereof away from said support.

References Cited by the Examiner

UNITED STATES PATENTS

| | | | |
|---|---|---|---|
| 1,800,670 | 4/1931 | Venzie | 52—714 X |
| 1,974,819 | 9/1934 | Koerner | 20—92 X |
| 2,099,632 | 11/1937 | Starr | 52—573 X |
| 2,200,649 | 5/1940 | Wardle | 52—314 X |
| 2,285,631 | 6/1942 | Urbain | 52—363 X |
| 2,316,424 | 4/1943 | Hasenburger | 20—92.5 |

FOREIGN PATENTS

| | | |
|---|---|---|
| 40,109 | 1/1932 | France. |
| 21,200 | 9/1912 | Great Britain. |
| 690,078 | 4/1953 | Great Britain. |
| 599,317 | 10/1959 | Italy. |

RICHARD W. COOKE, Jr., *Primary Examiner.*

HENRY C. SUTHERLAND, JACOB L. NACKENOFF, *Examiners.*